United States Patent
Park et al.

(10) Patent No.: US 12,388,944 B2
(45) Date of Patent: Aug. 12, 2025

(54) ELECTRONIC DEVICE AND METHOD FOR CAPTURING IMAGE BY USING ANGLE OF VIEW OF CAMERA MODULE

(71) Applicant: Samsung Electronics Co., Ltd., Suwon-si (KR)

(72) Inventors: Junghoon Park, Suwon-si (KR); Jeonggyu Jo, Suwon-si (KR); Seungbo Shim, Suwon-si (KR); Dongil Son, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 78 days.

(21) Appl. No.: 18/447,790

(22) Filed: Aug. 10, 2023

(65) Prior Publication Data
US 2023/0388441 A1   Nov. 30, 2023

Related U.S. Application Data

(63) Continuation of application No. PCT/KR2022/003153, filed on Mar. 7, 2022.

(30) Foreign Application Priority Data

Mar. 18, 2021   (KR) .................. 10-2021-0035434

(51) Int. Cl.
*H04N 5/262*     (2006.01)
*H04N 23/611*    (2023.01)
*H04N 23/90*     (2023.01)

(52) U.S. Cl.
CPC ......... *H04N 5/2624* (2013.01); *H04N 5/2628* (2013.01); *H04N 23/611* (2023.01); *H04N 23/90* (2023.01)

(58) Field of Classification Search
CPC .. H04N 5/2624; H04N 5/2628; H04N 23/611; H04N 23/90; H04N 23/45; H04N 23/635; H04N 23/695
See application file for complete search history.

(56) References Cited

U.S. PATENT DOCUMENTS

2005/0075550 A1   4/2005   Lindekugel
2006/0155232 A1   7/2006   Ceriani
(Continued)

FOREIGN PATENT DOCUMENTS

JP     2012095792 A     5/2012
JP     5411003 B2      11/2013
(Continued)

OTHER PUBLICATIONS

International Search Report for PCT/KR2022/002419 mailed Jun. 13, 2022, 4 pages.
(Continued)

*Primary Examiner* — Mekonnen D Dagnew
(74) *Attorney, Agent, or Firm* — Nixon & Vanderhye P.C.

(57) ABSTRACT

An electronic device may include: a first camera module that captures a first image at a first angle of view; a second camera module that captures a second image at a second angle of view different from the first angle of view; and a processor configured to activate the second camera module in response to a case in which at least one of objects detected in the first image deviates from the first angle of view.

15 Claims, 20 Drawing Sheets

(56) References Cited

U.S. PATENT DOCUMENTS

| | | | |
|---|---|---|---|
| 2015/0229889 A1* | 8/2015 | Boettiger | H04N 23/71 |
| | | | 348/262 |
| 2019/0030708 A1 | 1/2019 | Holgate et al. | |
| 2019/0328553 A1 | 10/2019 | Sankai | |
| 2020/0128181 A1* | 4/2020 | An | G06T 7/20 |
| 2021/0398333 A1* | 12/2021 | Kalu | G06T 11/60 |

FOREIGN PATENT DOCUMENTS

| | | |
|---|---|---|
| JP | 6485596 B2 | 3/2019 |
| JP | 6829092 B2 | 1/2021 |
| KR | 20190021665 A | 3/2019 |
| KR | 20190101225 A | 8/2019 |
| KR | 20190101226 A | 8/2019 |
| KR | 20190101848 A | 9/2019 |
| KR | 20190108861 A | 9/2019 |
| KR | 20190109191 A | 9/2019 |
| KR | 20210021389 A | 2/2021 |

OTHER PUBLICATIONS

Written Opinion of the ISA for PCT/KR2022/002419 mailed Jun. 13, 2022, 3 pages.

* cited by examiner

ELECTRONIC DEVICE AND METHOD FOR CAPTURING IMAGE BY USING ANGLE OF VIEW OF CAMERA MODULE

CROSS-REFERENCE TO RELATED APPLICATIONS

This application is a continuation application of International Application No. PCT/KR2022/003153 designating the United States, filed on Mar. 7, 2022, in the Korean Intellectual Property Receiving Office and claiming priority to Korean Patent Application No. 10-2021-0035434, filed on Mar. 18, 2021, in the Korean Intellectual Property Office, the disclosures of which are incorporated by reference herein in their entireties.

BACKGROUND

Technical Field

In certain example embodiments, there is provided an electronic device and/or method for capturing an image using at least the angle of view of a camera module.

Description of Related Art

In general, an electronic device provides camera functions to generate and store an image and/or a video by capturing an external object(s). The camera functions initially used were only those required for basic capturing, storing, and transmitting, but techniques for improving performance, quality, and functions are being developed to meet the various needs of users. Recent electronic devices may include a plurality of camera modules, and each of the plurality of camera modules may have a different angle of view. An angle of view refers to an angle at which a camera may capture an image through a lens of the camera. When a camera has a wide angle of view, the range of capturing is widened such that many objects may be captured, and when a camera has a narrow angle of view, objects within a limited range may be captured. An electronic device may acquire different images using a plurality of cameras having different angles of view and display the acquired images on a display area.

SUMMARY

An electronic device according to an example embodiment may include a first camera module, comprising a camera, configured to capture a first image at a first angle of view, a second camera module, comprising a camera, configured to capture a second image at a second angle of view different from the first angle of view, and a processor configured to activate the second camera module in response to at least one of objects detected in the first image being out of the first angle of view.

The processor may be configured to display the first image in a first partial area within a display area and display the second image in a second partial area within the display area.

The processor may be configured to generate a cropped image by cropping an area including the at least one object from the second image, and display the first image in a first partial area within a display area and display the generated cropped image in a second partial area within the display area.

The processor may be configured to resize the generated cropped image based on the first image. "Based on" as used herein covers based at least on.

The processor may be configured to resize the generated cropped image based on a comparison between a first object area displaying a reference object in the first image and a second object area displaying the reference object in the second image, and the reference object may be different from the at least one object.

The processor may be configured to determine the sizes and positions of the first partial area and the second partial area within the display area, in response to at least one or a combination of two or more of the size, shape, ratio, and position of the first partial area, the size, shape, ratio, and position of the second partial area, and a user input, and resize the first image according to the determined size of the first partial area and resize the generated cropped image according to the determined size of the second partial area.

The processor may be configured to activate the second camera module in response to at least a portion of a target object among a plurality of objects detected from the first image being out of the first angle of view, display an area including the remaining objects excluding the target object among the plurality of objects from the first image in a first partial area, and display an area including the target object from the second image in a second partial area.

The electronic device according to an example embodiment may further include a third camera module, comprising a camera, configured to capture a third image at a third angle of view different from the second angle of view, wherein the processor may be further configured to activate the third camera module in response to at least one of objects detected in the second image being out of the second angle of view. A "camera" herein may comprise one or more of imaging circuitry, at least one lens, and/or an image sensor.

The processor may be configured to deactivate the first camera module in response to the second camera module being activated.

The first camera module may include a first image sensor having a plurality of sensing elements configured to receive light and convert the light into image signals, and the processor may be further configured to acquire a landscape image by reading out a first sensing element corresponding to a first sensing area among the plurality of sensing elements, acquire a portrait image by reading out a second sensing element corresponding to a second sensing area among the plurality of sensing elements, and map the acquired landscape image and the acquired portrait image to each other.

The processor may be configured to select one of the objects detected in the first image and generate a cropped image by cropping an area including the selected object from the acquired portrait image, and display the acquired landscape image in a first partial area within a display area and display the generated cropped image in a second partial area within the display area.

An example method performed by an electronic device may include capturing a first image at a first angle of view of a first camera module, and activating a second camera module configured to capture a second image at a second angle of view different from the first angle of view, in response to at least one of objects detected in the first image being out of the first angle of view.

An electronic device according to an example embodiment may activate a second camera module when at least one of objects detected from a first image is out of a first angle of view. An electronic device according to an example embodiment may display an object out of the angle of view of a first camera module in a display area based on a second image captured by a second camera module.

An electronic device according to an example embodiment may generate a cropped image by cropping a second image based on an object out of the angle of view of a first camera module. An electronic device according to an example embodiment may adjust the size of an object by resizing a generated cropped image, display an image including the object whose size is adjusted in a display area, and thereby provide a user with a sense of unity between a plurality of images displayed in the display area.

BRIEF DESCRIPTION OF DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
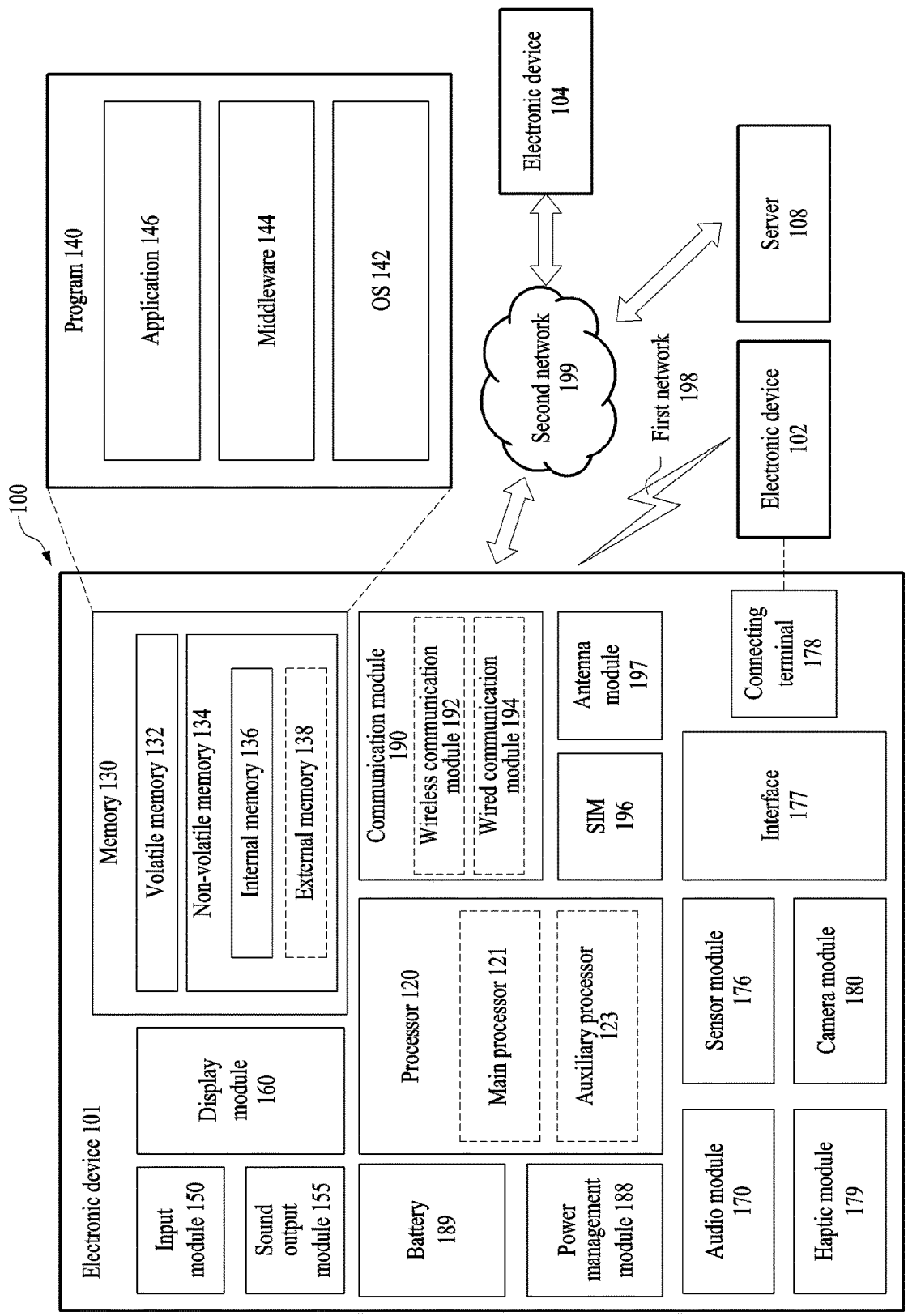
FIG. 1 is a block diagram illustrating an electronic device in a network environment according to an example embodiment.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the components may be omitted from the electronic device 101, or one or more other components may be added in the electronic device 101. In some embodiments, some of the components (e.g., the sensor module 176, the camera module 180, or the antenna module 197) may be integrated as a single component (e.g., the display module 160).

The processor 120 may execute, for example, software (e.g., a program 140) to control at least one other component (e.g., a hardware or software component) of the electronic device 101 connected, directly or indirectly, to the processor 120, and may perform various data processing or computation. According to an embodiment, as at least a part of data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a portion of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state, or together with the main processor 121 while the main processor 121 is an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence model processing. An AI model may be generated through machine learning. Such learning may be performed, for example, by the electronic device 101 in which an artificial intelligence model is executed, or via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network, or a combination of two or more thereof but is not limited thereto. The artificial intelligence model may, additionally or alternatively, include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to sense a touch, or a pressure sensor adapted to measure the intensity of force incurred by the touch.

The audio module 170 may convert a sound into an electrical signal or vice versa. According to an embodiment, the audio module 170 may obtain the sound via the input module 150 or output the sound via the sound output module 155 or an external electronic device (e.g., the electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected, directly or indirectly, to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and/or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as, for example, at least part of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190, which may comprise communication circuitry, may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more CPs that are operable independently of the processor 120 (e.g., an AP) and that support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192, which may comprise communication circuitry, may support a 5G network after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a part of the antenna module 197.

According to an embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of the same type as or a different type from the electronic device 101. According to an embodiment, all or some of operations to be executed by the electronic device 101 may be executed at one or more external electronic devices (e.g., the external electronic devices 102 and 104, and the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., a smart home, a smart city, a smart car, or healthcare) based on 5G communication technology or IoT-related technology.

Figure 2:
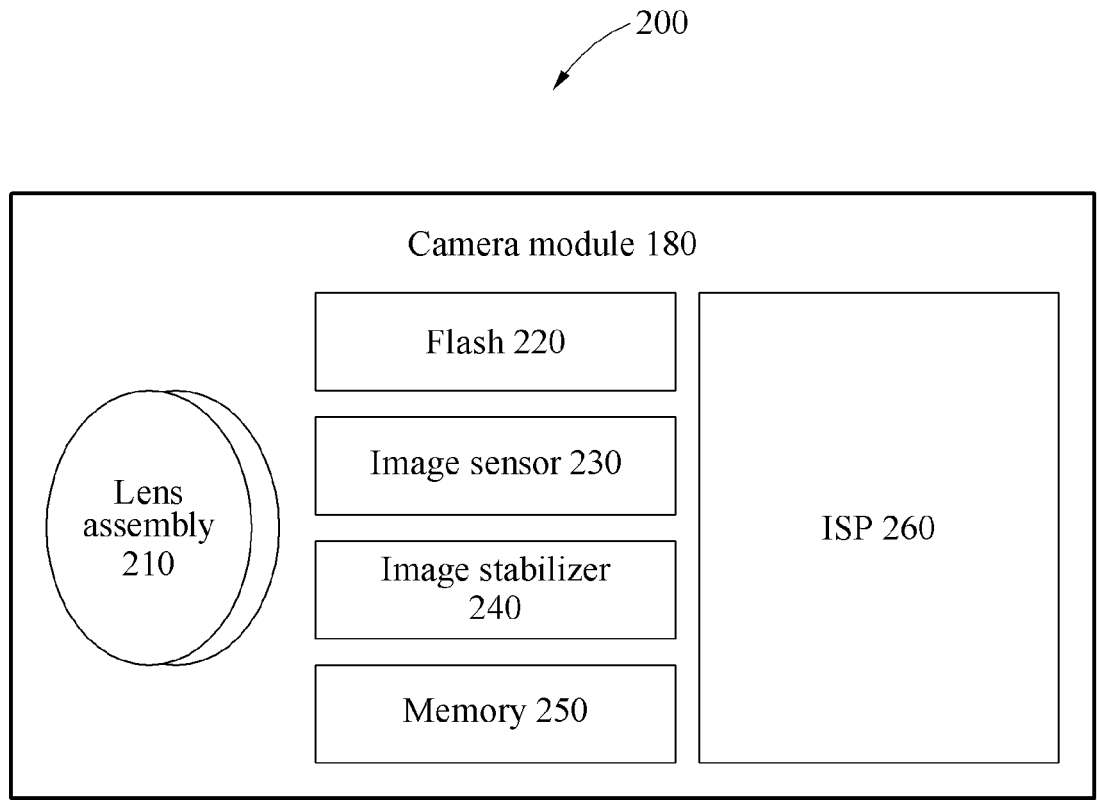
FIG. 2 is a block diagram illustrating a camera module according to an example embodiment.

FIG. 2 is a block diagram 200 illustrating the camera module 180 according to various embodiments. According to an embodiment, the electronic device 101 may include a plurality of camera modules 180 having different properties or functions. In this case, for example, at least one of the plurality of camera modules 180 may be a wide-angle camera, and at least another one of the plurality of camera modules 180 may be a telephoto camera. Similarly, at least one of the plurality of camera modules 180 may be a front camera, and at least another one of the plurality of camera modules 180 may be a rear camera.

Referring to FIG. 2, the camera module 180 may include a lens assembly 210, a flash 220, an image sensor 230, an image stabilizer 240, a memory 250 (e.g., a buffer memory), or an ISP 260. The lens assembly 210 may collect light emitted from an object which is a target of which an image is to be captured. The lens assembly 210 may include one or more lenses. According to an embodiment, the camera module 180 may include a plurality of lens assemblies 210.

In this case, the camera module 180 may constitute, for example, a dual camera, a 360-degree camera, or a spherical camera. A portion of the lens assemblies 210 may have the same lens properties (e.g., an angle of view, a focal length, an auto focus, an f number, or an optical zoom), or at least one lens assembly may have one or more lens properties that are different from those of another lens assembly. The lens assembly 210 may include, for example, a wide-angle lens or a telephoto lens. Thus, each "camera module" herein may comprise one or more of imaging circuitry, at least one lens, and/or an image sensor.

The flash 220 may emit light to be used to enhance light emitted or reflected from the object. According to an embodiment, the flash 220 may include one or more light-emitting diodes (LEDs) (e.g., a red-green-blue (RGB) LED, a white LED, an infrared (IR) LED, or an ultraviolet (UV) LED), or a xenon lamp. The image sensor 230 may obtain an image corresponding to the object by converting light emitted or reflected from the object and transmitted through the lens assembly 210 into an electrical signal. According to an embodiment, the image sensor 230 may include, for example, one image sensor selected from among image sensors having different properties, such as, for example, an RGB sensor, a black and white (BW) sensor, an IR sensor, or a UV sensor, a plurality of image sensors having the same property, or a plurality of image sensors having different properties. Each image sensor included in the image sensor 230 may be implemented using, for example, a charged coupled device (CCD) sensor or a complementary metal-oxide-semiconductor (CMOS) sensor.

The image stabilizer 240 may move at least one lens included in the lens assembly 210 or the image sensor 230 in a specific direction, or control an operation characteristic of the image sensor 230, in response to a movement of the camera module 180 or the electronic device 101 including the camera module 180. For example, the image stabilizer 240 may adjust a read-out timing. This may compensate for at least a portion of a negative effect of the movement on an image to be captured. According to an embodiment, the image stabilizer 240 may sense such a movement of the camera module 180 or the electronic device 101 using a gyro sensor (not shown) or an acceleration sensor (not shown) disposed inside or outside the camera module 180. According to an embodiment, the image stabilizer 240 may be implemented as, for example, an optical image stabilizer. The memory 250 may at least temporarily store at least a portion of the image obtained through the image sensor 230 for a subsequent image processing task. For example, when image acquisition is delayed by a shutter or a plurality of images is obtained at a high speed, an obtained original image (e.g., a Bayer-patterned image or a high-resolution image) may be stored in the memory 250, and a copy image (e.g., a low-resolution image) corresponding the original image may be previewed through the display module 160. Subsequently, when a specified condition (e.g., a user input or a system command) is satisfied, at least a portion of the original image stored in the memory 250 may be obtained and processed by, for example, the ISP 260. According to an embodiment, the memory 250 may be configured as at least part of the memory 130 or as a separate memory operated independently of the memory 130.

The ISP 260 may perform one or more image processing operations on the image obtained through the image sensor 230 or the image stored in the memory 250. The image processing operations may include, for example, depth map generation, three-dimensional (3D) modeling, panorama generation, feature point extraction, image synthesis, or image compensation (e.g., noise reduction, resolution adjustment, brightness adjustment, blurring, sharpening, or softening. Additionally or alternatively, the ISP 260 may control at least one of the components (e.g., the image sensor 230) included in the camera module 180 (e.g., control an exposure time, control a read-out timing, or the like). The image processed by the ISP 260 may be stored again in the memory 250 for further processing or may be provided to an external component (e.g., the memory 130, the display module 160, the electronic device 102, the electronic device 104, or the server 108) of the camera module 180. According to an embodiment, the ISP 260 may be configured as at least part of the processor 120 or as a separate processor operated independently of the processor 120. When the ISP 260 is configured as a processor separate from the processor 120, at least one image processed by the ISP 260 may be displayed as it is or be displayed through the display module 160 after additional image processing is performed by the processor 120.

The electronic device according to the embodiments disclosed herein may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic device is not limited to those described above.

It should be appreciated that embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "at least one of A, B, or C", each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via at least a third element(s). As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC). Thus, each "module" herein may comprise circuitry.

Embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include code generated by a compiler or code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments disclosed herein may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to embodiments, each component (e.g., a module or a program) of the above-described components may include a single entity or multiple entities, and some of the multiple entities may be separately disposed in different components. According to an embodiment, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
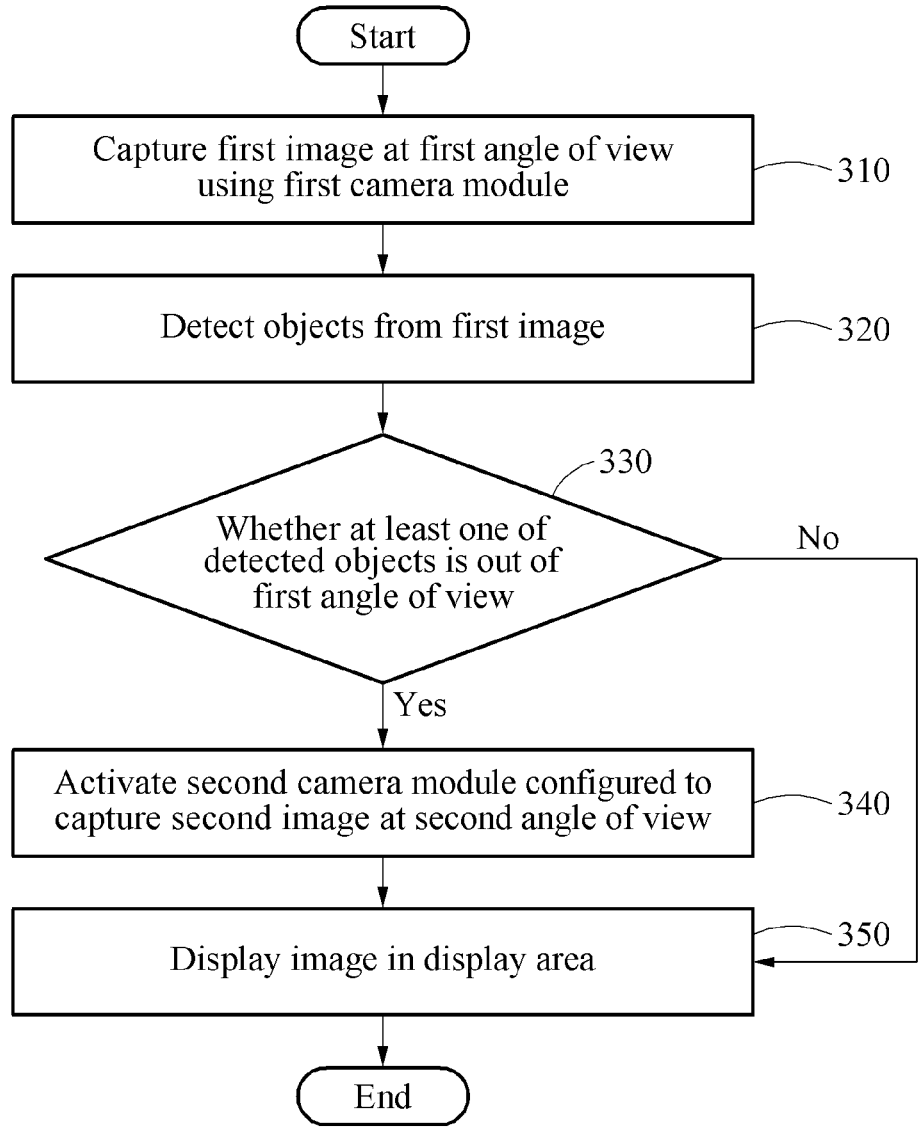
FIG. 3 is a flowchart illustrating an operation of an electronic device according to an example embodiment.

FIG. 3 is a flowchart illustrating an operation of an electronic device according to an embodiment.

In operation 310, an electronic device (e.g., the electronic device 101 of FIG. 1) according to an embodiment may capture a first image at a first angle of view using a first camera module.

The electronic device according to an embodiment may include a plurality of camera modules (e.g., the camera module 180 of FIGS. 1 and 2) having different angles of view. The electronic device according to an embodiment may include a first camera module configured to capture a first image at a first angle of view, a second camera module configured to capture a second image at a second angle of view different from the first angle of view, and a third camera module configured to capture a third image at a third angle of view different from the first angle of view and the second angle of view. However, the number of camera modules included in the electronic device is not limited thereto.

In operation 320, a processor (e.g., the processor 120 of FIG. 1) of the electronic device according to an embodiment may detect objects from the first image. The objects may be, for example, human faces, humans, vehicles, or animals (e.g., cats or dogs). In this specification, it is assumed that the electronic device extracts human faces as objects from an image.

In operation 330, the electronic device according to an embodiment may determine whether at least one of the objects detected from the first image is out of the first angle of view.

In operation 340, the electronic device according to an embodiment may activate a second camera module having a second angle of view when at least one of the objects detected from the first image is out of the first angle of view.

In operation 350, the electronic device according to an embodiment may display at least one image containing the detected objects in a display area within a display module (e.g., the display module 160 of FIG. 1). The electronic device according to an embodiment may display the first image in the display area within the display module when the objects detected from the first image are not out of the first angle of view. When at least one of the objects detected from the first image is out of the first angle of view, the electronic device may activate the second camera module to capture a second image and display the first image and the second image in the display area within the display module.

Figure 4:
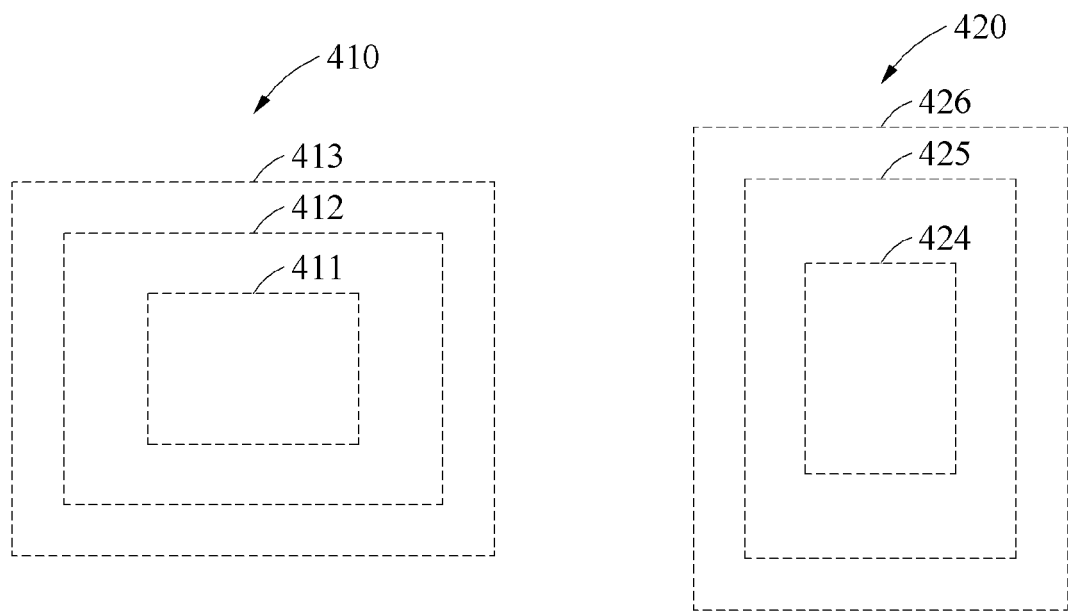
FIG. 4 illustrates an angle of view of a camera module included in an electronic device according to an example embodiment.

FIG. 4 illustrates an angle of view of a camera module included in an electronic device according to an embodiment.

A field of view (FOV) 410 may be an area in which objects are viewed when an electronic device (e.g., the electronic device 101 of FIG. 1) according to an embodiment performs capturing with a camera module (e.g., the camera module 180 of FIGS. 1 and 2) disposed in a horizontal direction. A first FOV 411 may be an area in which objects corresponding to a first angle of view are viewed when objects are captured with a first camera module disposed in a horizontal direction. A second FOV 412 may be an area in which objects corresponding to a second angle of view are viewed when objects are captured with a second camera module disposed in a horizontal direction. A third FOV 413 may be an area in which objects corresponding to a third angle of view are viewed when objects are captured with a third camera module disposed in a horizontal direction. A camera module includes an image sensor having a plurality of sensing elements for receiving light and converting the light into an image signal. Disposing a camera module in a horizontal direction is disposing an image sensor in such a direction that the number of sensing elements on the horizontal axis is greater than the number of sensing elements on the vertical axis. Similarly, disposing a camera module in a vertical direction is disposing an image sensor in such a direction that the number of sensing elements on the vertical axis is greater than the number of sensing elements on the horizontal axis.

According to an embodiment, as shown in FIG. 4, the second FOV 412 may be wider than the first FOV 411 and may include the first FOV 411. The third FOV 413 may be wider than the second FOV 412 and may include the second FOV 412. However, the first FOV corresponding to the first angle of view, the second FOV corresponding to the second angle of view, and the third FOV corresponding to the third angle of view are not limited to those shown in FIG. 4.

According to another embodiment, only a partial area of the first FOV 411 may be included in the second FOV 412. According to another embodiment, the first FOV 411 and the second FOV 412 may not have overlapping areas.

Conversely, an FOV 420 may be an area in which objects are viewed when the electronic device according to an embodiment performs capturing with a camera module disposed in a vertical direction. A fourth FOV 424 may be an area in which objects are viewed when objects are captured with the first camera module disposed in a vertical direction. A fifth FOV 425 may be an area in which objects are viewed when objects are captured with the second camera module disposed in the vertical direction, and a sixth FOV 426 may be an area in which objects are viewed when an image is captured at a third angle of view with the third camera module in the vertical direction.

Figure 5:
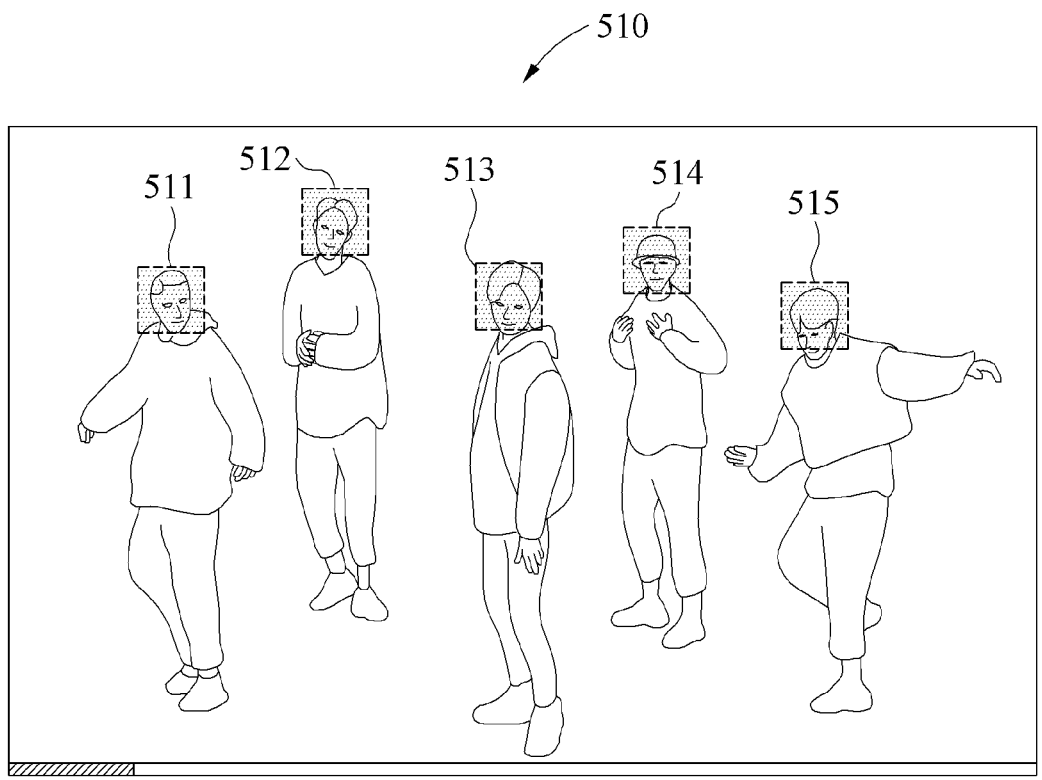
FIG. 5 illustrates a process of detecting objects from an image by an electronic device according to an example embodiment.

FIG. 5 illustrates a process of detecting objects from an image by an electronic device according to an embodiment.

An electronic device (e.g., the electronic device 101 of FIG. 1) according to an embodiment may capture an image 510 using a camera module (e.g., the camera module 180 of FIGS. 1 and 2). The electronic device may detect objects (e.g., human faces) from the image 510.

The electronic device according to an embodiment may detect objects by recognizing human faces on the image 510 captured by the camera module. Further, the electronic device may track the objects detected in the image captured by the camera module. Specifically, the electronic device may detect object areas 511, 512, 513, 514, and 515 displaying objects (e.g., areas including human faces) from the image. The electronic device may continuously track the object areas 511, 512, 513, 514, and 515 displaying objects within the image. The object areas may be areas corresponding to objects within the image. For example, when the electronic device detects human faces as objects, the object areas may be areas including the human faces. For example, the object areas may be rectangular areas. The electronic device may determine whether an object is out of the angle of view of the camera module by tracking the object areas detected from the image.

According to an embodiment, the electronic device may calculate the number of objects detected in the image (e.g., 5) by tracking the object areas detected from the image 510. The electronic device may determine that at least one object is out of the angle of view of the camera module when the number of objects detected in continuous images captured by the camera module decreases.

FIGS. 6a, 6b, 7a and 7b illustrate cases in which at least one of objects detected in an image is out of a first angle of view.

Figure 6A:
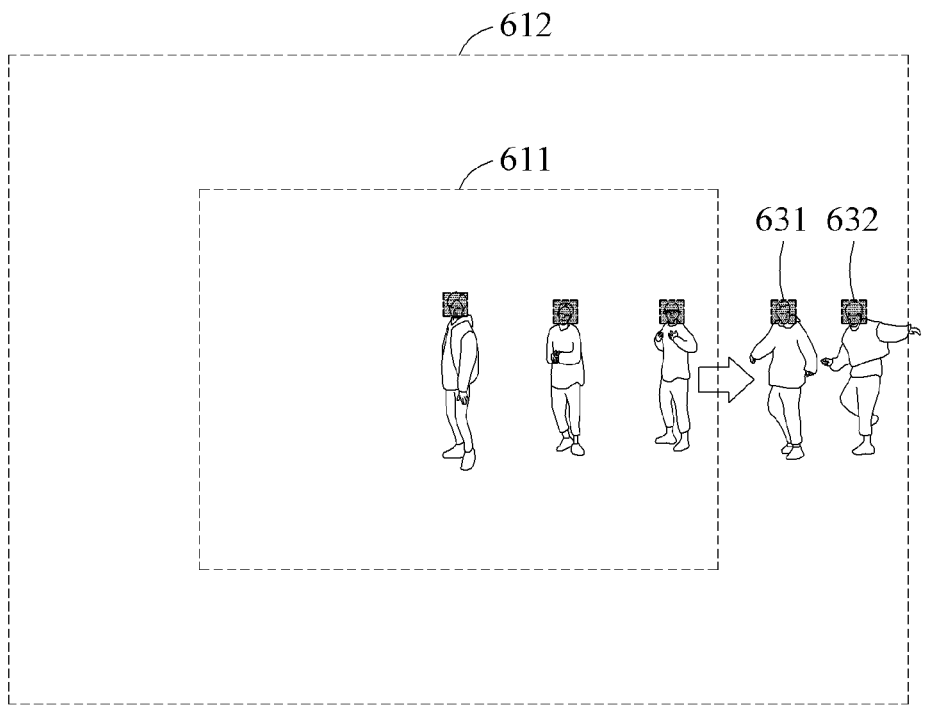
FIGS. 6A and 6B illustrate example cases in which at least one of objects detected from a first image is out of a first angle of view when capturing the objects with a camera module disposed in a horizontal direction by an example electronic device.
Figure 6B:
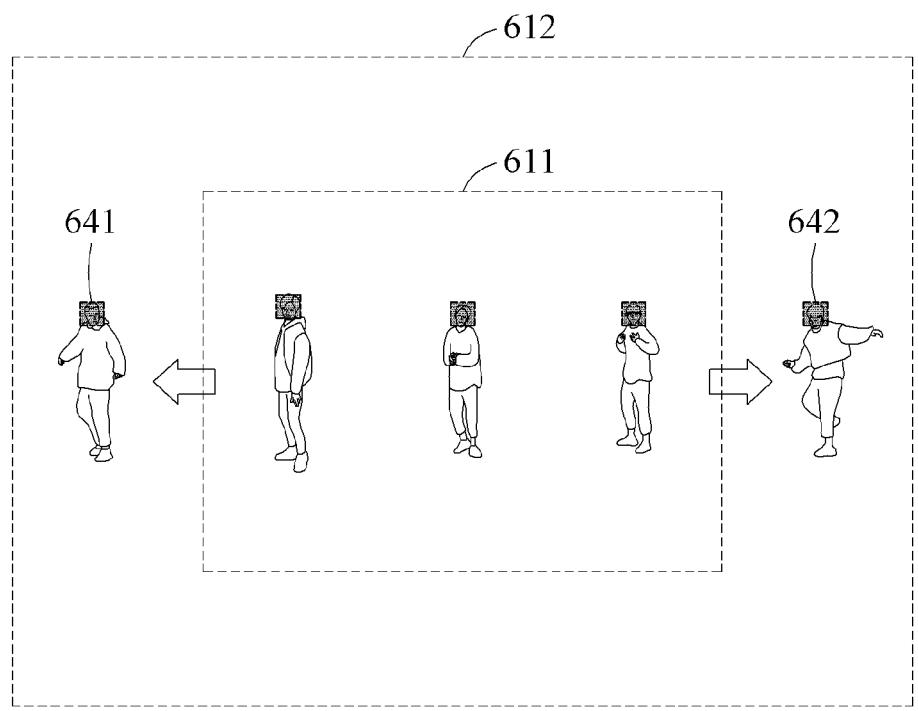

FIGS. 6A and 6B illustrate cases in which at least one of objects detected from a first image is out of a first angle of view when capturing the objects with a camera module disposed in a horizontal direction by an electronic device.

An electronic device may capture a first image at a first angle of view using a first camera module. At least one of objects detected in the first image may be out of the first angle of view and be within a second angle of view of a second camera module. When at least one of the objects detected in the first image is out of the first angle of view and the at least one object out of the first angle of view is within the second angle of view of the second camera module, the electronic device may activate the second camera module. According to an embodiment, when at least one object is out of the first angle of view, the electronic device may further activate the second camera module while the first camera module is activated. As described below, according to another embodiment, the electronic device may activate the second camera module and deactivate the first camera module when at least one object is out of the first angle of view.

In the present specification, that an object detected in an image is within the angle of view of a camera module is equivalent to that an object area detected in the image is in the FOV corresponding to the angle of view. That an object detected in an image is out of the angle of view is equivalent to that an object area detected from the image is out of the FOV corresponding to the angle of view.

The electronic device according to an embodiment may activate the first camera module to capture a first image at a first angle of view. When at least one object area 631 and 632 of object areas detected in the first image are out of a first FOV 611 corresponding to the first angle of view and within a second FOV 612 corresponding to the second angle of view, the electronic device may activate the second camera module to capture a second image at the second angle of view. FIG. 6A shows a case in which the object areas 631 and 632 get out of the first FOV 611 in the same direction, and FIG. 6B shows a case in which object areas 641 and 642 get out of the first FOV 611 in different directions. Although not shown in FIGS. 6A and 6B, when at least one object detected in the second image is out of the second angle of view of the second camera module and in a third angle of view of a third camera module, the electronic device according to an embodiment may activate the third camera module.

Figure 7A:
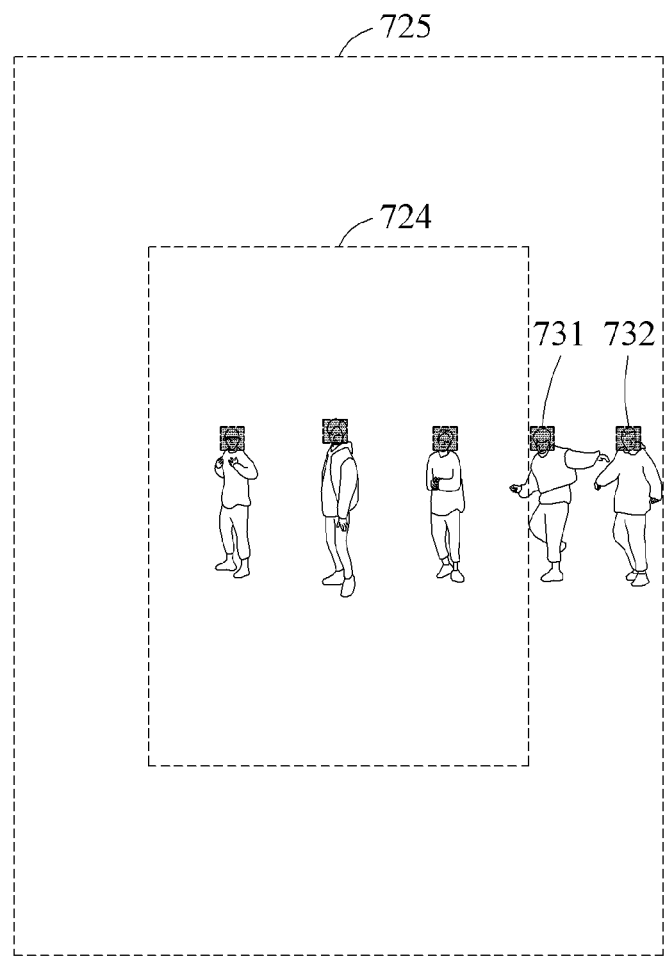
FIGS. 7A and 7B illustrate example cases in which at least one of objects detected from a first image is out of a first angle of view when capturing the objects with a camera module disposed in a vertical direction by an example electronic device.
Figure 7B:
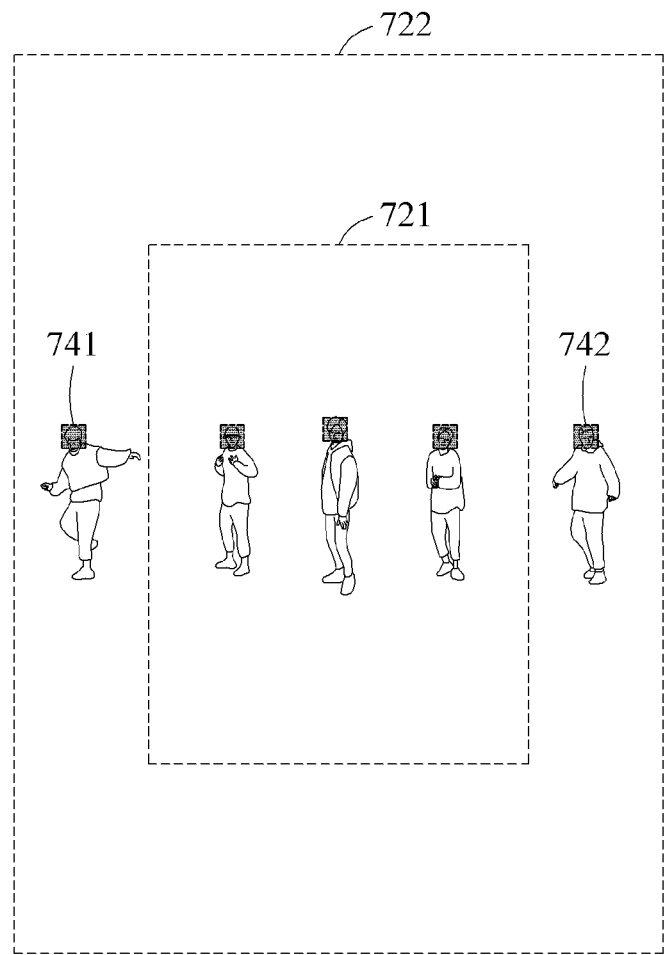

FIGS. 7A and 7B illustrate cases in which at least one of objects detected from a first image is out of a first angle of view when capturing the objects with a camera module disposed in a vertical direction by an electronic device.

As described with reference to FIG. 6, when at least one object area 731 and 732 of object areas detected in the first image are out of a fourth FOV 724 corresponding to the first angle of view and within a fifth FOV 725 corresponding to the second angle of view, the electronic device may activate the second camera module to capture a second image at the second angle of view. FIG. 7A shows a case in which the object areas 731 and 732 get out of the fourth FOV 724 in the same direction, and FIG. 7B shows a case in which object areas 741 and 742 get out of the fourth FOV 724 in different directions.

Figure 8A:
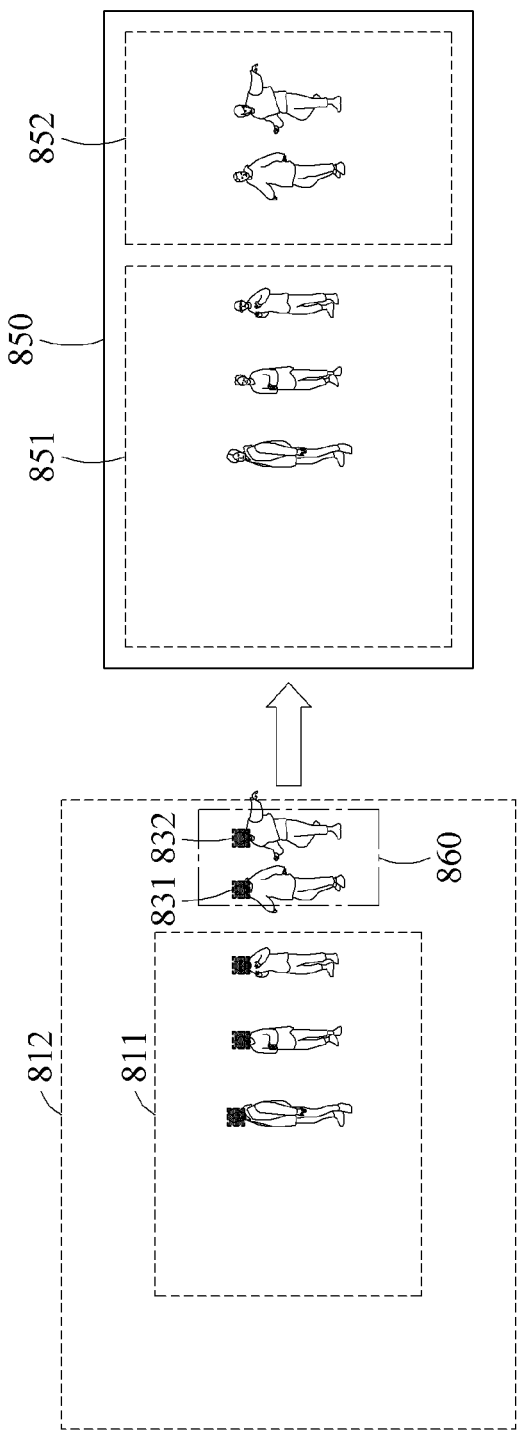
FIGS. 8A and 8B illustrate a process of displaying a captured image in a display area within a display module by an electronic device according to an example embodiment.
Figure 8B:
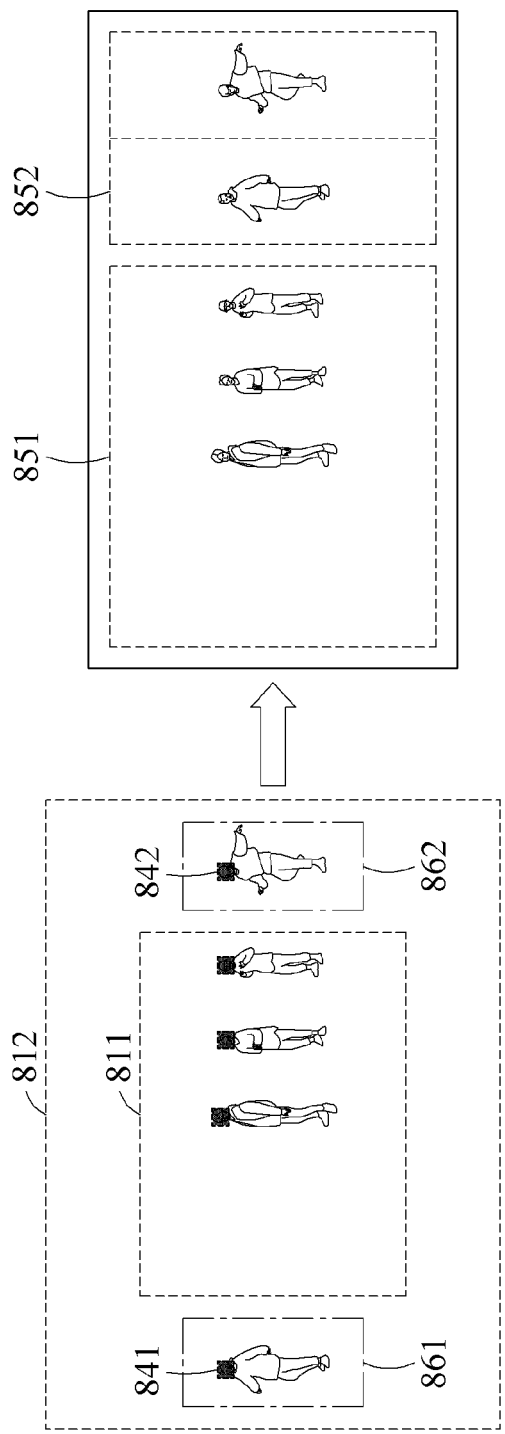

FIGS. 8A and 8B illustrate a process of displaying a captured image in a display area within a display module by an electronic device according to an embodiment.

An electronic device (e.g., the electronic device 101 of FIG. 1) according to an embodiment may display a first image captured at a first angle of view of a first camera module (e.g., the camera module 180 of FIGS. 1 and 2) in a first partial area 851 within a display area and display a second image captured at a second angle of view of a second camera module in a second partial area 852 within the display area. The first image may be an image captured by the first camera module at the first angle of view, and the second image may be an image captured by the second camera module at the second angle of view. The first image corresponds to a first FOV 811, and the second image corresponds to a second FOV 812.

The electronic device according to an embodiment may divide the entire display area 850 into the plurality of display areas 851 and 852. When none of the objects detected from the first image is out of the first FOV 811, the electronic device may not activate the second camera module. In this case, the electronic device may display the first image as one on the entire display area 850 without dividing the entire display area 850. In response to at least one of the objects detected from the first image being out of the first FOV 811, the electronic device may divide the entire display area into the first partial area 851 and the second partial area 852. In response to the second camera module being activated, the electronic device may divide the entire display area into the first partial area 851 and the second partial area 852. The first partial area 851 and the second partial area 852 may not overlap each other within the display area.

According to an embodiment, the electronic device may display the first image including objects within the first FOV 811 in the first partial area 851 and display the second image including objects out of the first FOV 811 in the second partial area 852. According to another embodiment, the electronic device may display the first image in the first partial area 851 and display a cropped image generated by cropping a partial area of the second image in the second partial area 852. The generated cropped image may include the objects out of the first angle of view. The electronic device may generate the cropped image by cropping the second image based on the objects out of the first angle of view. The electronic device may generate the cropped image by cropping an area 860 including at least one object (e.g., an area including people) out of the first angle of view from the second image. The electronic device may display the cropped image generated from the second image in the second partial area 852. FIG. 8A illustrates a process of cropping a second image when object areas 831 and 832 get out of the first FOV 811 in the same direction. When the object areas 831 and 832 get out of the first FOV 811 in the same direction and the object areas 831 and 832 are within the second FOV 812, the electronic device may generate the cropped image by cropping the one area 860 including the object areas 831 and 832 (e.g., the area including people) from the second image. The electronic device may display the generated cropped image in the second partial area 852.

FIG. 8B illustrates a process of cropping a second image when object areas 841 and 842 get out of the first FOV 811 in different directions. When the object areas 841 and 842 get out of the first FOV 811 in different directions and the object areas 841 and 842 are within the second FOV 812, the electronic device may generate a plurality of cropped images by cropping an area 861 including the object area 841 (e.g., an area including a person) and an area 862 including the object area 842 (e.g., an area including a person), respectively, from the second image. The electronic device according to an embodiment may display the generated plurality of cropped images separately in the second partial area 852.

Figure 9:
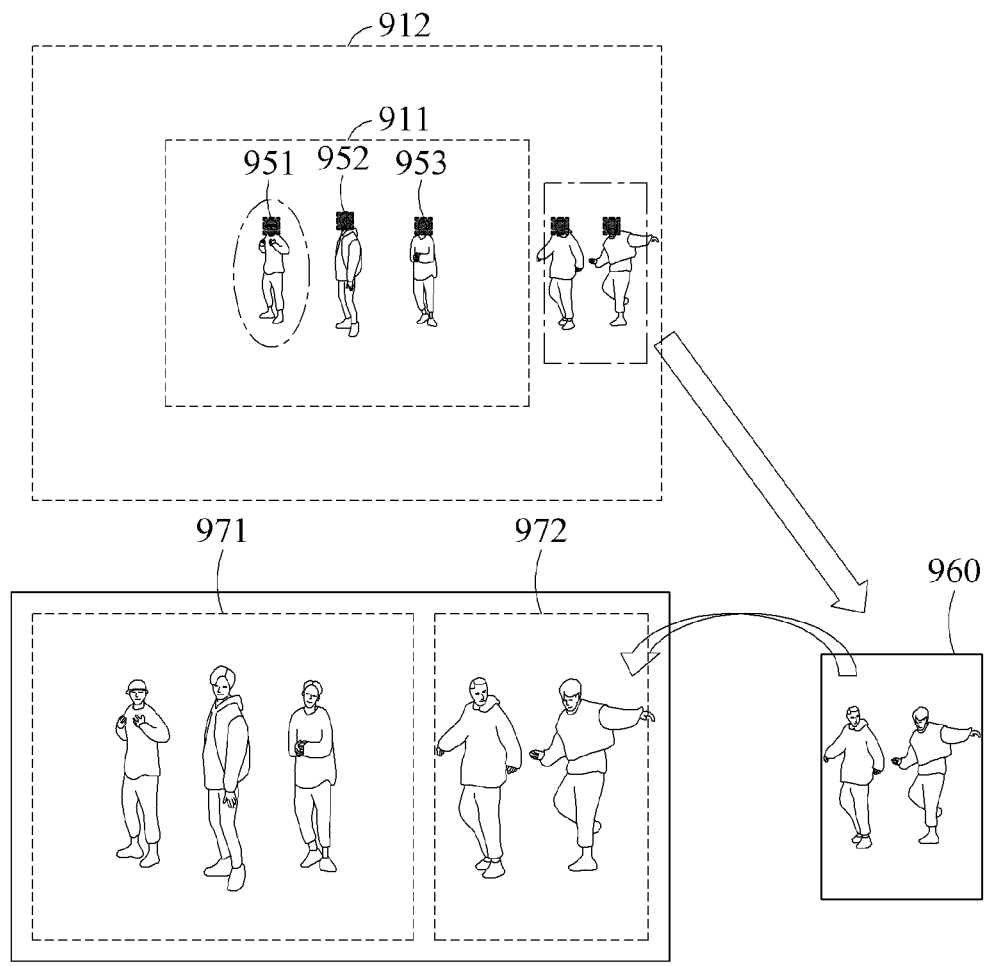
FIG. 9 illustrates a process of resizing a cropped image by an electronic device according to an example embodiment.

FIG. 9 illustrates a process of resizing a cropped image by an electronic device according to an embodiment.

An electronic device (e.g., the electronic device 101 of FIG. 1) according to an embodiment may resize a cropped image 960 generated from a second image. Since the electronic device captures a plurality of images with a plurality of camera modules having different angles of view and different magnifications, objects detected from different images may have different sizes. For example, the size of an object detected in a first image captured by a first camera module may be different from the size of an object detected in a second image captured by a second camera module. The electronic device may adjust the size of objects by resizing the generated cropped image 960. The electronic device may display an image including objects whose size is adjusted in a display area and thereby provide a user with a sense of unity between the plurality of images displayed in the display area. Hereinafter, the description will be provided based on the electronic device that resizes the cropped image 960, but the electronic device may resize the first image or the second image as well as the cropped image 960.

The electronic device according to an embodiment may resize the cropped image 960 based on the first image. According to an embodiment, the electronic device may resize the cropped image 960 using a reference object that simultaneously exists within the first angle of view of the first camera module and the second angle of view of the second camera module. The reference object is an object different from the object out of the first angle of view. For example, the electronic device may select one object area 951 from the object areas 951, 952, and 953 that simultaneously exist in a first FOV 911 corresponding to the first angle of view and a second FOV 912 corresponding to the second angle of view. The selected object area 951 may be an object area corresponding to the reference object. The electronic device may capture the first image including the reference object at the first angle of view using the first camera module and capture the second image including the reference object at the second angle of view using the second camera module. The electronic device may resize the cropped image 960 based on a comparison between a first object area displaying the reference object (e.g., an area corresponding to a human face) in the first image and a second object area displaying the reference object (e.g., an area corresponding to a human face) in the second image.

According to an embodiment, in the electronic device, an object area displaying an object may be a rectangular area. The electronic device may calculate each of the number of pixels corresponding to the height of the first object area displaying the reference object and the number of pixels corresponding to the width of the first object area in the first image. Similarly, the electronic device may calculate the number of pixels corresponding to the height of the second object area displaying the reference object in the second image and calculate the number of pixels corresponding to the width of the second object area in the second image. The electronic device may resize the height of the cropped image 960 at a ratio of the number of pixels corresponding to the height of the first object area to the number of pixels corresponding to the height of the second object area. The electronic device may resize the width of the cropped image 960 at a ratio of the number of pixels corresponding to the width of the first object area to the number of pixels corresponding to the width of the second object area.

According to another embodiment, the electronic device may calculate the total number of pixels of the first object area displaying the reference object from the first image and calculate the total number of pixels of the second object area displaying the reference object from the second image. The electronic device may resize the height and width of the cropped image 960 at a ratio of the total number of pixels of the first object area to the total number of pixels of the second object area. A method of resizing the cropped image 960 by the electronic device according to an embodiment is not limited to the above examples, and the cropped image may be resized in various other manners. The electronic device may display the first image in a first partial area 971 and display the resized cropped image in a second partial area 972.

According to another embodiment, the electronic device may resize the height of the second image at a ratio of the number of pixels corresponding to the height of the first object area to the number of pixels corresponding to the height of the second object area, and resize the width of the second image at a ratio of the number of pixels corresponding to the width of the first object area to the number of pixels corresponding to the width of the second object area. The electronic device according to an embodiment may crop the resized second image based on an object out of the first angle of view and display the cropped image in the second partial area 972. "Based on" as used herein covers based at least on.

Figure 10:
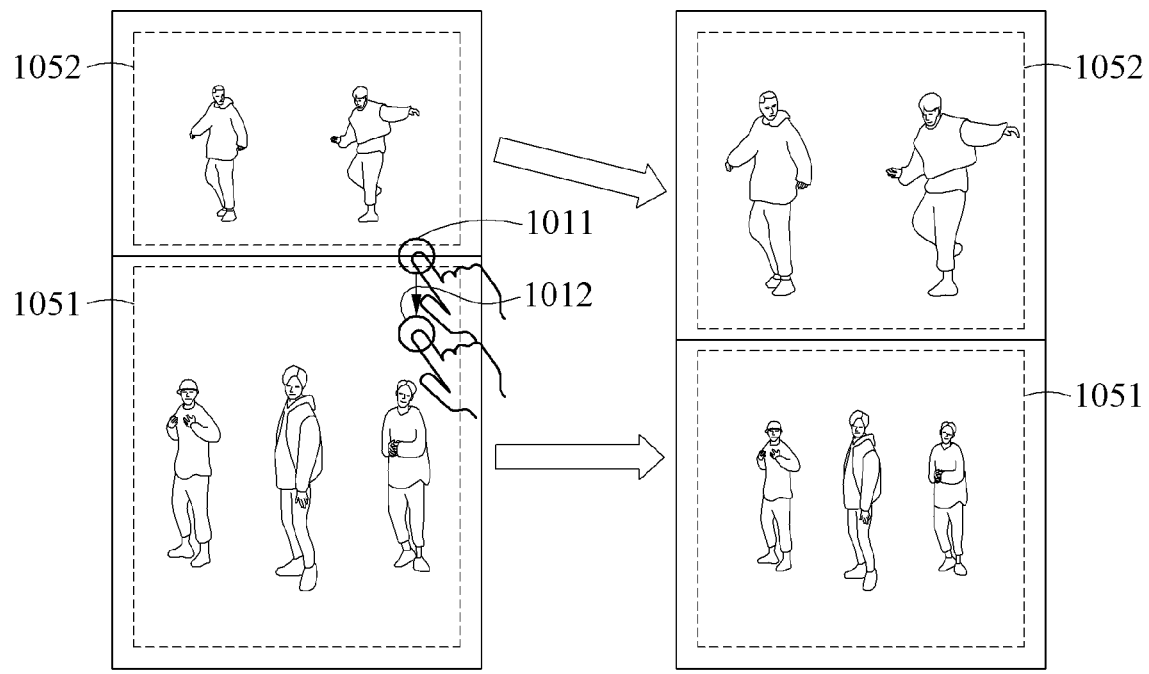
FIG. 10 illustrates a process of determining the size and position of a partial area within a display area by an electronic device according to an example embodiment.

FIG. 10 illustrates a process of determining the size and position of a partial area within a display area by an electronic device according to an embodiment.

A processor (e.g., the processor 120 of FIG. 1, comprising processing circuitry) of an electronic device (e.g., the electronic device 101 of FIG. 1) according to an embodiment may determine the sizes and positions of a first partial area 1051 and a second partial area 1052 within a display area, in response to at least one or a combination of two or more of the size, shape, ratio, and position of the first partial area 1051, the size, shape, ratio, and position of the second partial area 1052, and a user input. For example, when the shape of the first partial area and the shape of the second partial area are determined to be circular, the electronic device may appropriately determine the sizes and positions of the first partial area 1051 and the second partial area 1052 within the display module so that the first partial area 1051 and the second partial area 1052 may each have a circular shape within the display area.

For another example, the electronic device may adjust the sizes of the first partial area and the second partial area according to a received user input. The electronic device may receive a drag input on a boundary line between the first partial area 1051 and the second partial area 1052 from the user. The drag input may be an input of clicking or touching a point 1011 corresponding to the boundary line between the first partial area and the second partial area, moving while maintaining the click or touch, and releasing the click or touch at another point 1012. When a drag input of a user is received, the electronic device may change the boundary line between the first partial area and the second partial area to correspond to the point 1012 at which the click or touch is released, and increase or decrease the size of the first partial area 1051 and the size of the second partial area 1052 according to the changed boundary line. The electronic device according to an embodiment may resize a first image displayed in the first partial area 1051 according to the determined size of the first partial area 1051 and resize a cropped image displayed in the second partial area 1052 according to the determined size of the second partial area 1052. For example, as shown in FIG. 10, it is assumed that a partial area of a display module is a rectangular area in the electronic device according to an embodiment. The electronic device may calculate the number of pixels corresponding to each of the height and the width of the first partial area before the change and calculate the number of pixels corresponding to each of the height and the width of the first partial area after the change. The electronic device may resize the height of the first image at a ratio of the height of the first partial area after the change to the height of the first partial area before the change and resize the width of the first image at a ratio of the width of the first partial area after the change to the width of the first partial area before the change. The electronic device may display the resized first image in the corresponding first partial area after the change. Similarly, the electronic device may display the resized cropped image in the corresponding second partial area after the change.

Figure 11:
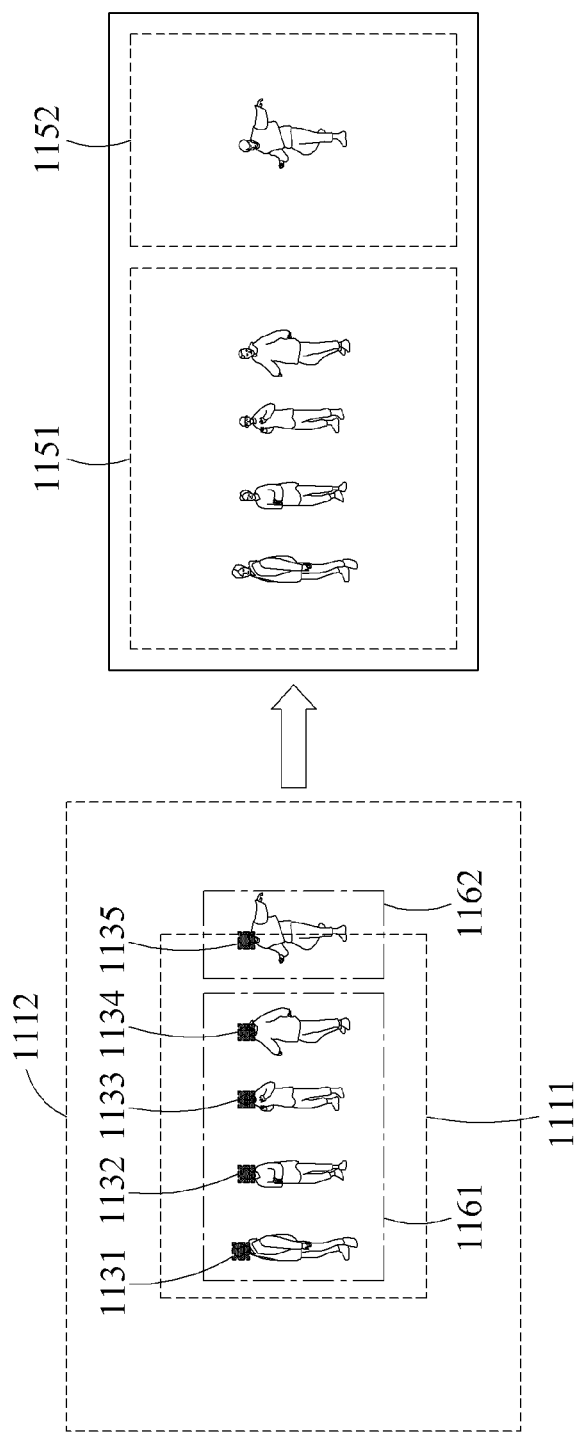
FIG. 11 illustrates a case in which at least a portion of a target object among objects detected from an image of an electronic device is out of a first angle of view according to an example embodiment.

FIG. 11 illustrates a case in which at least a portion of a target object among objects detected from an image of an electronic device is out of a first angle of view according to an embodiment.

An electronic device according to an embodiment may activate a second camera module in response to at least a portion of a target object among a plurality of objects detected from a first image being out of a first angle of view. At least a portion of the target object is a portion of a human face. When a portion of an area 1135 displaying the target object among a plurality of object areas 1131, 1132, 1133, 1134, and 1135 detected from the first image is out of a first FOV 1111, the electronic device may activate the second camera module. The electronic device may crop an area 1161 including the remaining object areas 1131, 1132, 1133, and 1134 (e.g., an area including people), excluding a target object area 1135 among the detected plurality of object areas 1131, 1132, 1133, 1134, and 1135, from the first image and display the cropped area 1161 in a first partial area 1151, and crop an area 1162 including the target object area 1135 (e.g., an area including a person) from a second image and display the cropped area 1162 in a second partial area 1152. When a portion of the target object is out of the first angle of view, the electronic device according to an embodiment may display an area including the remaining objects, excluding the target object among the detected plurality of objects, in a first partial area and display an area including the target object separately in a second partial area.

Figure 12:
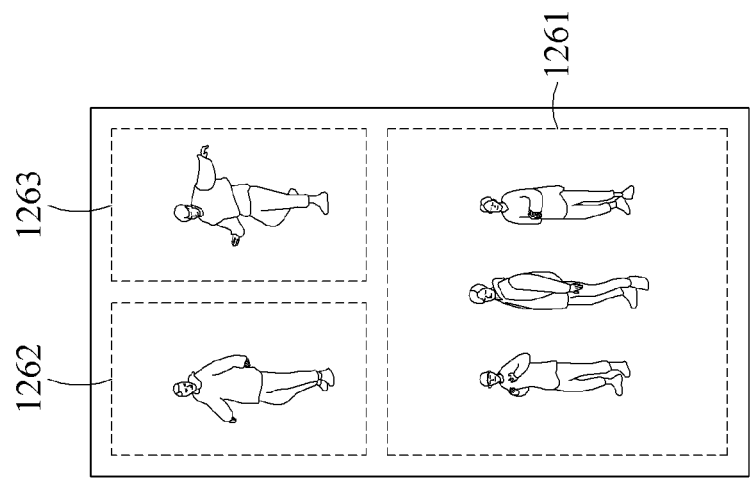
FIG. 12 illustrates a case in which an electronic device activates a third camera module according to an example embodiment.
Figure 12:
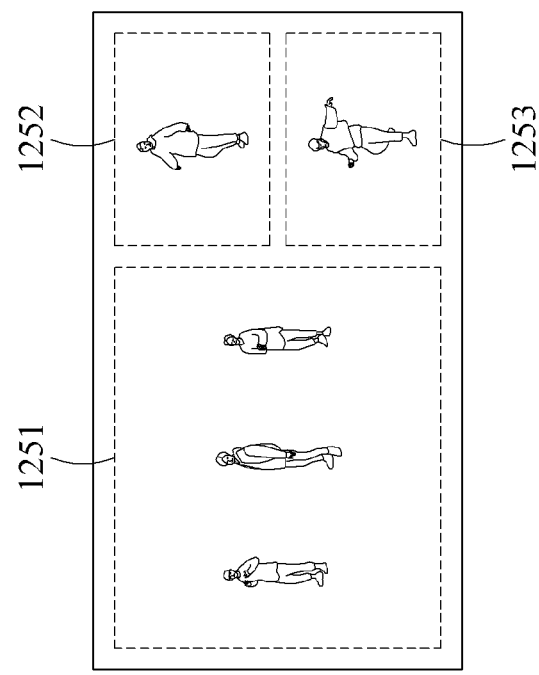

FIG. 12 illustrates a case in which an electronic device activates a third camera module according to an embodiment.

An electronic device according to an embodiment may include a first camera module, a second camera module, and a third camera module. A third angle of view of the third camera module may be different from a first angle of view of the first camera module and a second angle of view of the second camera module. The electronic device according to an embodiment may activate the third camera module in response to at least one of objects detected in a second image being out of the second angle of view. The electronic device may display images captured by the respective camera modules in a display area. For example, when at least one of the objects detected from the second image is out of the second angle of view and the object out of the second angle of view is in the third angle of view, the electronic device may divide the display area into a first partial area 1251 or 1261, a second partial area 1252 or 1262, and a third partial area 1253 or 1263. According to an embodiment, the electronic device may display a first image captured using the first camera module in the first partial area 1251 or 1261, display the second image captured using the second camera module in the second partial area 1252 or 1262, and display a third image captured using the third camera module in the third partial area 1253 or 1263. According to another embodiment, the electronic device may display the first image in the first partial area 1251 or 1261, crop the second image based on an object out of the first angle of view, display the cropped second image in the second partial area 1252 or 1262, crop the third image based on the object out of the second angle of view, and display the cropped third image in the third partial area 1253 or 1263.

According to an embodiment, the electronic device may activate the second camera module when at least one of objects detected from the first image is out of the first angle of view, and deactivate the first camera module in response to the second camera module being activated. The electronic device may display the first image captured by the first camera module in the display area while the first camera module is being activated. When at least one object is out of the first angle of view, the electronic device may activate the second camera module to capture the second image with the second camera module. The electronic device may display the second image instead of the first image in the display area by activating the second camera module and deactivating the first camera module at the same time. For example, it is assumed that a second FOV corresponding to the second angle of view of the second camera module is wider than a first FOV corresponding to the first angle of view of the first camera module and that the second FOV includes the first FOV. The electronic device may display the second image instead of the first image in the display area, thereby displaying all the objects detected from the first image in the display area.

Figure 13:
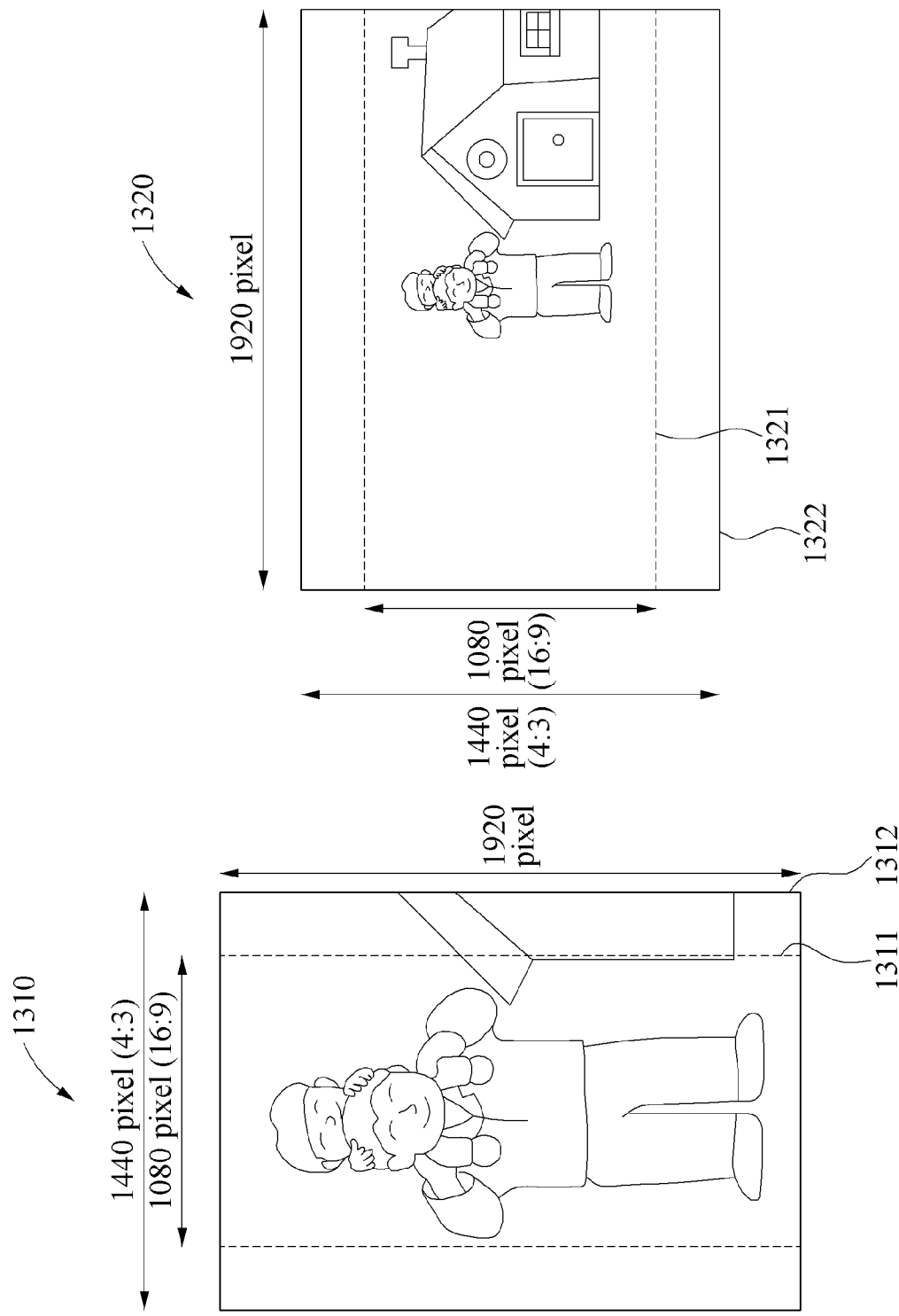
FIG. 13 illustrates an image captured using a camera module by a conventional electronic device.

FIG. 13 illustrates an image captured using a camera module by a conventional electronic device.

A camera module of an electronic device according to an embodiment may include an image sensor having a plurality of optical sensing elements (hereinafter, referred to as "sensing elements") for receiving light and converting the light into image signals. A sensing element is an element configured to sense optical information based on light reflected from a physical location on a subject and incident to the corresponding element. For example, a sensing element may output a value indicating the intensity of incident light. The sensing element may include a photodiode.

An image sensor of a camera module included in a conventional electronic device may include a plurality of sensing elements arranged in an array form. An image sensor may be disposed in a vertical direction to receive light reflected from a subject, and an image sensor may be disposed in a horizontal direction to receive light reflected from the subject. Disposing an image sensor in a horizontal direction indicates the number of sensing elements arranged on the horizontal axis (e.g., 1920) is greater than the number of sensing elements arranged on the vertical axis (e.g., 1440). Disposing an image sensor in a vertical direction indicates the number of sensing elements arranged on the vertical axis (e.g., 1920) is greater than the number of sensing elements arranged on the horizontal axis (e.g., 1440). The image sensor of the conventional camera module may include 1920×1440 sensing elements. A portrait image 1310 may be an image in which the number of pixels on the horizontal axis is greater than the number of pixels on the vertical axis. A landscape image 1320 may be an image in which the number of pixels on the vertical axis is greater than the number of pixels on the horizontal axis. Here, a pixel may be basic unit information constituting an image.

The conventional electronic device may acquire a portrait image 1311 having a resolution of 1080×1920 by reading out 1080×1920 sensing elements from the image sensor having 1920×1440 sensing elements. The electronic device may change the resolution of a portrait image by changing an area to read out sensing elements from the image sensor. For example, the electronic device may acquire a portrait image 1312 having a maximum resolution of 1440×1920 by reading all 1440×1920 sensing elements from the corresponding image sensor.

The conventional electronic device may acquire a landscape image 1321 having a resolution of 1920×1080 by reading out 1920×1080 sensing elements from the image sensor having 1920×1440 sensing elements. The electronic device may acquire a portrait image 1322 having a maximum resolution of 1920×1440 by reading all 1920×1440 sensing elements from the corresponding image sensor.

Figure 14:
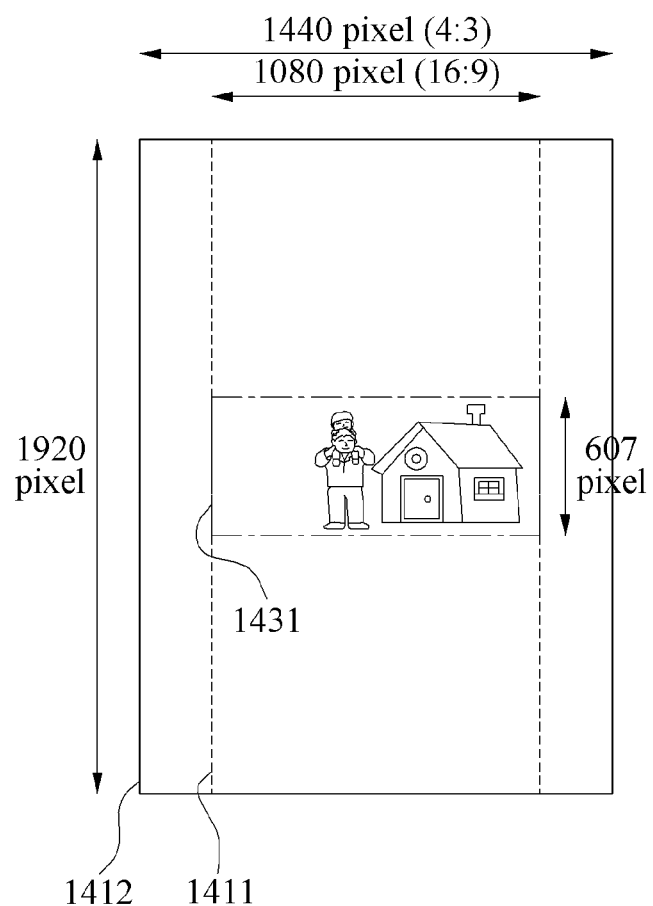
FIG. 14 illustrates a process of acquiring a landscape image using a camera module by a conventional electronic device.

FIG. 14 illustrates a process of acquiring a landscape image using a camera module by a conventional electronic device.

As to a conventional electronic device, it is assumed that an image sensor is disposed in a vertical direction to receive light reflected from a subject. The conventional electronic device may acquire a portrait image 1411 by reading out 1080×1920 sensing elements from the image sensor having 1920×1440 sensing elements and acquire a portrait image 1412 by reading out 1440×1920 sensing elements. On the other hand, when the image sensor is disposed in a vertical direction in the conventional electronic device, generally in order to acquire a landscape image, a landscape image 1431 may be acquired by reading out 1080×607 sensing elements from the image sensor having 1920×1440 sensing elements. When the conventional electronic device acquires the landscape image 1431 (e.g., having a resolution of 1080×607) using a camera module of the image sensor disposed in the vertical direction, the number of sensing elements to be read out decreases, and thus, the resolution of the landscape image 1431 may inevitably decrease.

Figure 15A:
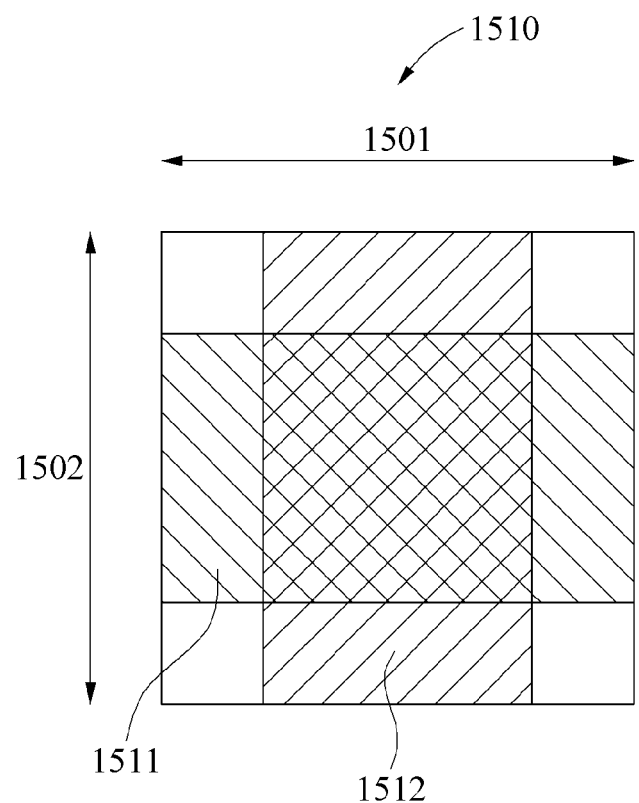
FIGS. 15A and 15B illustrate a shape of an image sensor of a camera module in an electronic device according to an example embodiment.
Figure 15B:
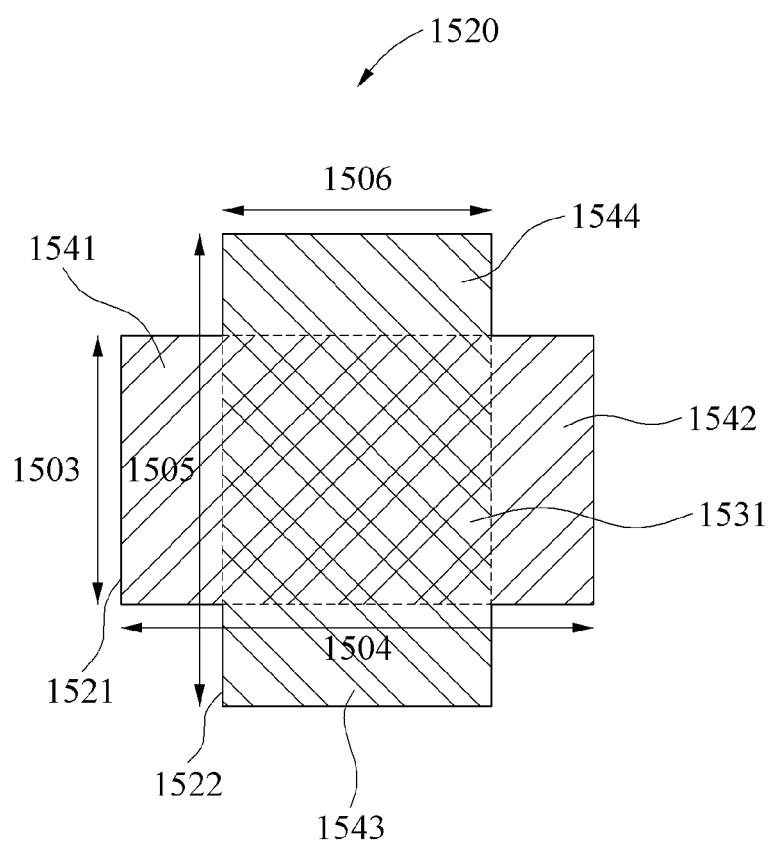

FIGS. 15A and 15B illustrate a shape of an image sensor of a camera module in an electronic device according to an embodiment.

Referring to FIG. 15A, a camera module of an electronic device according to an embodiment may include a square image sensor 1510. The image sensor 1510 may include 1920×1920 sensing elements. 1920 sensing elements may be disposed on a first side 1501 of the image sensor 1510, and 1920 sensing elements may be disposed on a second side 1502 perpendicular to the first side 1501.

The electronic device according to an embodiment may acquire a landscape image by reading out first sensing elements corresponding to a first sensing area 1511 among the 1920×1920 sensing elements of the image sensor. The electronic device according to an embodiment may acquire a portrait image by reading out second sensing elements corresponding to a second sensing area 1512 among the 1920×1920 sensing elements of the image sensor. The first sensing area 1511 may be an area including 1920×1080 sensing elements among the plurality of sensing elements included in the image sensor. The first sensing area 1511 may be rectangular area, wherein 1920 sensing elements may be disposed on one side thereof, and 1080 sensing elements may be disposed on the other side perpendicular to the one side. The second sensing area 1512 may be an area including 1080×1920 sensing elements among the plurality of sensing elements included in the image sensor. The second sensing area 1512 may be a rectangular area, wherein 1080 sensing elements may be disposed on one side thereof, and 1920 sensing elements may be disposed on the other side perpendicular to the one side.

Referring to FIG. 15B, a camera module of an electronic device according to an embodiment may include a cross-shaped image sensor 1520. Sensing areas of the image sensor 1520 may include a square sensing area 1531 and rectangular sensing areas 1541, 1542, 1543, and 1544 adjacent to the sensing area 1531. The square sensing area 1531 may be an area including 1080×1080 sensing elements. The rectangular sensing areas 1541, 1542, 1543, and 1544 may be areas each including 1080×420 sensing elements.

The electronic device according to an embodiment may acquire a landscape image by reading out third sensing elements corresponding to a third sensing area 1521 from the image sensor 1520 and acquire a portrait image by reading out fourth sensing elements corresponding to a fourth sensing area 1522. The third sensing area 1521 is an area including 1920×1080 sensing elements among the plurality of sensing elements included in the image sensor, the area corresponding to the first sensing area 1511. The third sensing area 1521 may be an area including the sensing area 1541, the sensing area 1531, and the sensing area 1542. 1080 sensing elements may be disposed on one side 1503 of the third sensing area 1521, and 1920 sensing elements may be disposed on the other side 1504 perpendicular to the one side 1503. The fourth sensing area 1522 is an area including 1080×1920 sensing elements among the plurality of sensing elements included in the image sensor, the area corresponding to the second sensing area 1512. The fourth sensing area is an area including the sensing area 1544, the sensing area 1531, and the sensing area 1543. 1920 sensing elements may be disposed on one side 1505 of the fourth sensing area 1522, and 1080 sensing elements may be disposed on the other side 1506 perpendicular to the one side.

An electronic device according to an embodiment may map the landscape image acquired by reading out the first sensing area and the portrait image acquired by reading out the second sensing area to each other. The electronic device may map the acquired landscape image and the acquired portrait image to each other and store the mapped images in a single image file. The electronic device may include a plurality of camera modules, and each of the plurality of camera modules may include at least one of the image sensor 1510 and the image sensor 1520. The electronic device may acquire a landscape image and a portrait image by reading out the 1920×1080 sensing elements, irrespective of the direction in which the image sensor is disposed, thereby preventing or reducing degradation of image resolution.

Figure 16:
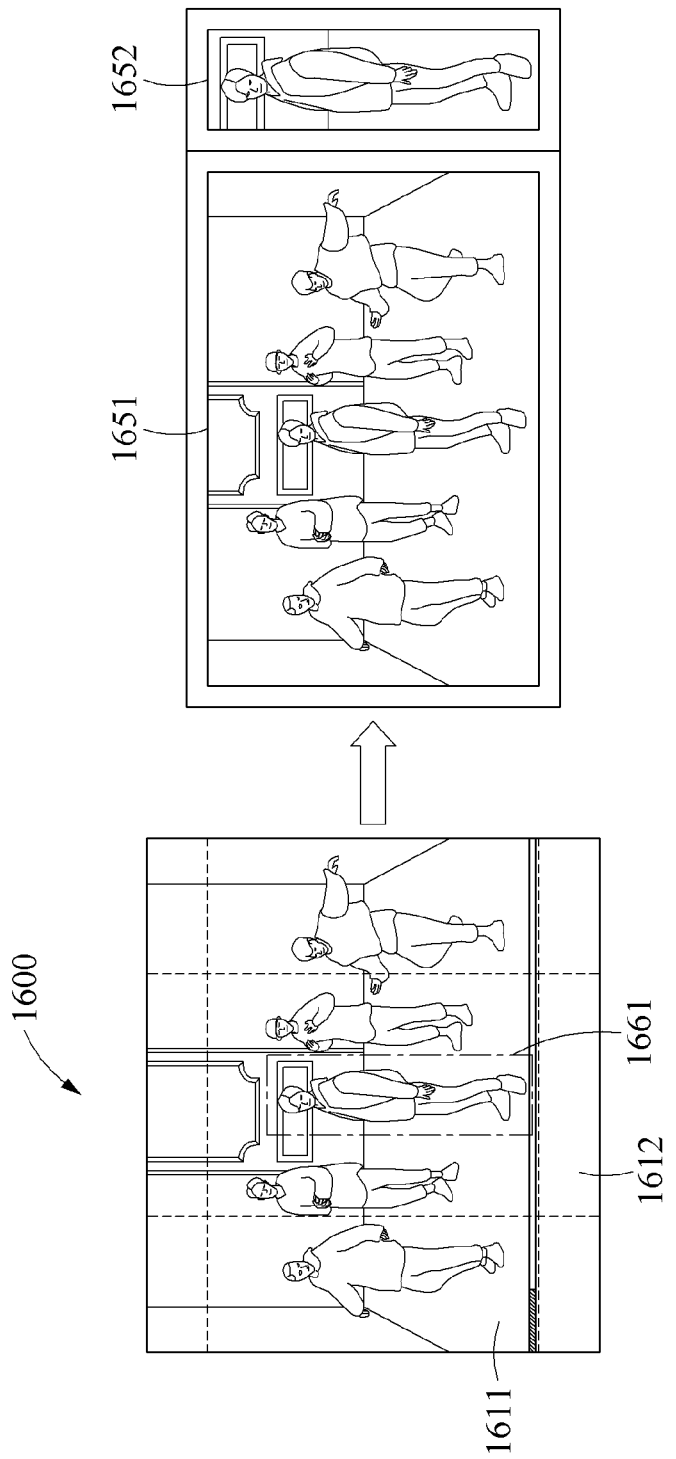
FIG. 16 illustrates a process of displaying an acquired landscape image and an acquired portrait image in a display area by an electronic device according to an example embodiment.

FIG. 16 illustrates a process of displaying an acquired landscape image and an acquired portrait image in a display area by an electronic device according to an embodiment.

An electronic device according to an embodiment may display images captured by a camera module in a display area. The electronic device according to an embodiment may acquire a landscape image by reading out first sensing elements corresponding to a first sensing area 1611 of an image sensor 1600 of the camera module and may acquire a portrait image by reading out second sensing elements corresponding to a second sensing area 1612 of the image sensor 1600. According to another embodiment, the electronic device may acquire a landscape image by capturing with one camera module and acquire a portrait image by capturing with another camera module. The plurality of camera modules included in the electronic device may include at least one of the image sensor 1510 and the image sensor 1520. The electronic device may acquire a landscape image by reading out sensing elements corresponding to a first sensing area of an image sensor included in a first camera module and acquire a portrait image by reading out sensing elements corresponding to a second sensing area of an image sensor included in a second camera module.

The electronic device according to an embodiment may display the landscape image and the portrait image in the display area. The electronic device may select one object from among objects detected in the images (the landscape image and the portrait image) captured by the first camera module. The electronic device may acquire the portrait image by reading out second sensing elements corresponding to the second sensing area 1612. The electronic device may generate a cropped image by cropping an area 1661 including an object area displaying the selected object (e.g., an area including a person) from the acquired portrait image. The electronic device may display the landscape image acquired by reading out first sensing elements corresponding to the first sensing area 1611 in a first partial area 1651 within the display area. The electronic device may display the cropped image cropped from the portrait image in a second partial area 1652 within the display area.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic device comprising:
a first camera, comprising imaging circuitry, configured to capture an image at a first angle of view;
a second camera, comprising imaging circuitry, configured to capture an image at a second angle of view different from the first angle of view;
memory comprising one or more storage medium storing instructions; and
at least one processor comprising processing circuitry;
wherein the instructions, when executed by the at least one processor individually and/or collectively, cause the electronic device to:
capture a first image at the first angle of view, using the first camera;
detect a target object in the first image;
activate the second camera based on a determination of at least a portion of the target object detected in the first image being out of the first angle of view;
capture a second image at the second angle of view, using the activated second camera;
display at least a portion of the first image in a first partial area within a display area of the display, and
display at least portion of the second image in a second partial area within the display area, wherein the at least portion of the second image comprises area displaying the at least portion of the target object being out of the first angle of view.

2. The electronic device of claim 1, wherein the electronic device further comprises a display; and
wherein the instructions, when executed by the at least one processor individually or collectively, cause the electronic device to:
display the first image in the first partial area, and
display the second image in the second partial area.

3. The electronic device of claim 1, wherein the electronic device further comprises a display; and
wherein the instructions, when executed by the at least one processor individually or collectively, cause the electronic device to:
generate a cropped image at least by cropping an area comprising the target object from the second image, and
display the first image in the first partial area,
display the generated cropped image in the second partial area.

4. The electronic device of claim 3,
wherein the instructions, when executed by the at least one processor individually or collectively, cause the electronic device to:
resize the generated cropped image based on the first image.

5. The electronic device of claim 3, wherein the instructions, when executed by the at least one processor individually or collectively, cause the electronic device to:
resize the generated cropped image based on a comparison between a first object area displaying a reference object in the first image and a second object area displaying the reference object in the second image, and
the reference object is different from the target object.

6. The electronic device of claim 3, wherein the instructions, when executed by the at least one processor individually or collectively, cause the electronic device to:
determine the sizes and positions of the first partial area and the second partial area within the display area, in response to at least one of the size, shape, ratio, and position of the first partial area, the size, shape, ratio, and position of the second partial area, and a user input, and
resize the first image based on the determined size of the first partial area and resize the generated cropped image based on the determined size of the second partial area.

7. The electronic device of claim 1, wherein the instructions, when executed by the at least one processor individually or collectively, cause the electronic device to:
activate the second camera in response to at least a portion of the target object among a plurality of objects detected from the first image being out of the first angle of view,
display an area comprising the remaining objects excluding the target object among the plurality of objects from the first image in a first partial area, and
display an area comprising the target object from the second image in a second partial area.

8. The electronic device of claim 1, further comprising:
a third camera, comprising imaging circuitry, configured to capture a image at a third angle of view different from the second angle of view, and
wherein the instructions, when executed by the at least one processor individually or collectively, cause the electronic device to:
activate the third camera based on a determination of at least one of objects detected in the second image being out of the second angle of view, and
capture a third image using the activated third camera.

9. The electronic device of claim 1,
wherein the instructions, when executed by the at least one processor individually or collectively, cause the electronic device to:
deactivate the first camera in response to the second camera being activated.

10. The electronic device of claim 1, wherein
the first camera comprises a first image sensor including a plurality of sensing elements configured to receive light and convert the light into image signals, each sensing element comprising circuitry, and
wherein the instructions, when executed by the at least one processor individually or collectively, cause the electronic device to:
acquire a landscape image at least by reading out a first sensing element corresponding to a first sensing area among the plurality of sensing elements,
acquire a portrait image at least by reading out a second sensing element corresponding to a second sensing area among the plurality of sensing elements, and
map the acquired landscape image and the acquired portrait image to each other.

11. The electronic device of claim 10,
wherein the instructions, when executed by the at least one processor individually or collectively, cause the electronic device to:
select at least one object detected in the first image and generate a cropped image at least by cropping an area comprising the selected object from the acquired portrait image, and
display the acquired landscape image in the first partial area
display the generated cropped image in the second partial area.

12. A method performed by an electronic device including camera, the method comprising:
capturing a first image at a first angle of view of a first camera comprising imaging circuitry;
detecting a target object in the first image; and
activating a second camera, comprising imaging circuitry, configured to capture a image at a second angle of view different from the first angle of view, based on determining that at least one object detected in the first image is out of the first angle of view
capturing a second image at the second angle of view of the second camera, using the activated second camera;
displaying at least portion of the first image in a first partial area within a display area of the display; and
displaying at least portion of the second image in a second partial area within the display area, wherein the at least portion of the second image comprises area displaying the at least portion of the target object being out of the first angle of view.

13. The method of claim 12, further comprising:
generating a cropped image at least by cropping an area comprising the target object from the second image,
wherein the displaying the at least portion of the first image comprises
displaying the first image in the first partial area; and
wherein the displaying the at least portion of the second image comprises displaying the generated cropped image in the second partial area.

14. The method of claim 13, wherein the generating of the cropped image comprises resizing the generated cropped image based on a comparison between a first object area displaying a reference object in the first image and a second object area displaying the reference object in the second image, and
the reference object is different from the target object.

15. The method of claim 12, further comprising:
acquiring a landscape image at least by reading out a first sensing element corresponding to a first sensing area among a plurality of sensing elements included in a first image sensor of the first camera;
acquiring a portrait image at least by reading out a second sensing element corresponding to a second sensing area among the plurality of sensing elements; and
mapping the acquired landscape image and the acquired portrait image to each other.

* * * * *